United States Patent [19]

Earl

[11] Patent Number: 4,867,802
[45] Date of Patent: Sep. 19, 1989

[54] AIR ADMITTANCE VALVE FOR USE IN DRAINAGE SYSTEMS

[76] Inventor: Raymond F. Earl, 7 Northdown, Stockbury, Kent ME9 7UL, England

[21] Appl. No.: 210,479

[22] Filed: Jun. 23, 1988

[51] Int. Cl.[4] .......................... F16K 15/03; E03F 5/08
[52] U.S. Cl. ........................................ 137/526; 4/211; 137/527.8
[58] Field of Search ................. 4/211, 218; 137/216.2, 137/526, 527.6, 527.8

[56] References Cited

U.S. PATENT DOCUMENTS

| | | | |
|---|---|---|---|
| 178,137 | 5/1876 | Garland | 137/216.2 |
| 623,478 | 4/1899 | Keene | 137/527.8 X |
| 735,007 | 7/1903 | Watson | 137/526 X |
| 1,978,507 | 10/1934 | Rand | 4/211 |
| 2,800,139 | 7/1957 | Langdon | 137/216.2 |
| 3,565,107 | 2/1971 | Bunch | 137/527.8 X |
| 3,815,629 | 6/1974 | Oberholtzer | 4/211 X |
| 3,941,151 | 3/1976 | Biddle | 4/211 X |
| 4,535,807 | 8/1985 | Ericson | 137/526 X |
| 4,545,398 | 10/1985 | Van Olst | 137/526 X |
| 4,556,084 | 12/1985 | Frawley | 137/526 |

FOREIGN PATENT DOCUMENTS

| | | |
|---|---|---|
| B511424 | 4/1980 | Australia . |
| EPA100657 | 2/1984 | European Pat. Off. . |
| EPA185109 | 12/1984 | European Pat. Off. . |
| A141588 | 5/1903 | Fed. Rep. of Germany . |
| A3403284 | 9/1984 | Fed. Rep. of Germany . |
| A10663 | of 1910 | United Kingdom . |
| A9758 | of 1912 | United Kingdom . |
| 2014697 | 8/1979 | United Kingdom . |
| 2124344 | 2/1984 | United Kingdom . |
| 2164128 | 3/1986 | United Kingdom ............... 137/526 |

Primary Examiner—Gerald A. Michalsky
Attorney, Agent, or Firm—Diller, Ramik & Wight

[57] ABSTRACT

An air admittance valve for use in drainage systems comprising a housing with an opening therein through which air passes into the drainage system, and a pivoted closure member adapted to close the opening and openable on a pressure difference between the system and the exterior.

3 Claims, 2 Drawing Sheets

AIR ADMITTANCE VALVE FOR USE IN DRAINAGE SYSTEMS

BACKGROUND OF THE INVENTION

This invention relates to an air admission valve for use in drainage systems.

In such drainage systems a valve is required to prevent the release of foul air, and to admit air under conditions of reduced pressure in the discharge pipes and stacks.

SUMMARY OF THE INVENTION

According to the present invention an air admittance valve for use in drainage systems comprises a body with an opening therein through which air passes into the drainage system, and a pivoted closure member adapted to close the opening and openable on a pressure difference between the system and the exterior.

Preferably the opening is arranged at an angle to the vertical, and in a preferred construction the angle is approximately 45°. In this case the closure member may seat on the opening by gravity.

The opening is preferably circular. The opening may also have a raised rim surrounding it adapted to be engaged by a seal of elastomeric material on the closure member, which in one construction is conveniently pivoted at its upper end, eg. by means of trunnions on the closure member received in mountings in the housing.

An air inlet is provided for admitting air into the housing and conveniently this is located at a level below the closure member. The air inlet may be annular and may also be provided with an insect net.

In one arrangement the housing may have a downwardly extending pipe for connection to a pipe of the drainage system, and in this arrangement the pipe may be provided with a rubber bushing.

The invention may be performed in various ways and one specific embodiment will now be described by way of example with reference to the accompanying drawings in which:

DESCRIPTION OF THE PREFERRED EMBODIMENTS

Figure 1:
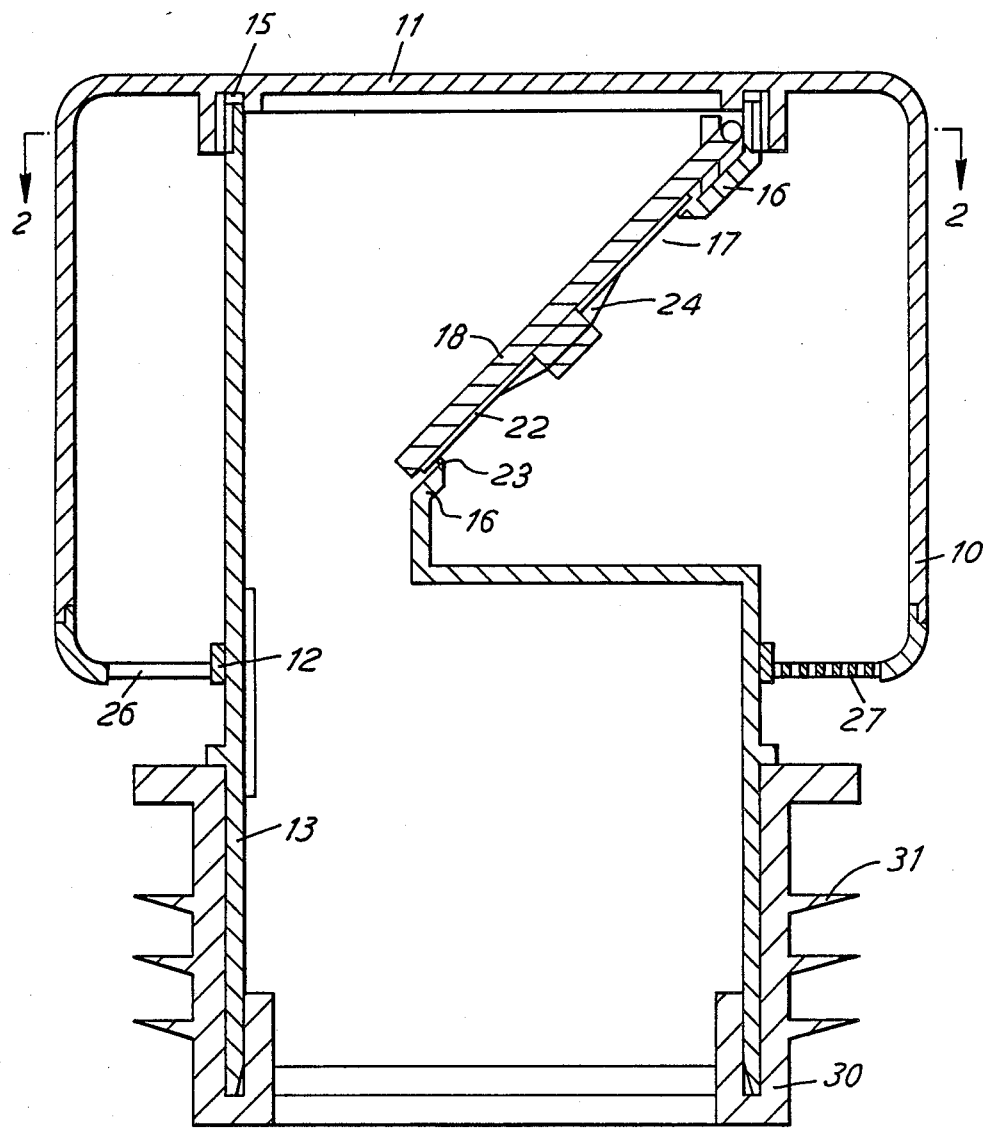
FIG. 1 is a cross section through an air admittance valve according to the present invention and, FIG. 2 is a section along the line 2-2 of FIG. 1.

In the drawings the valve comprises a circular housing 10 of plastics material closed at the top 11 and having a circular opening 12 in its base through which extends a circular pipe 13.

Figure 2:
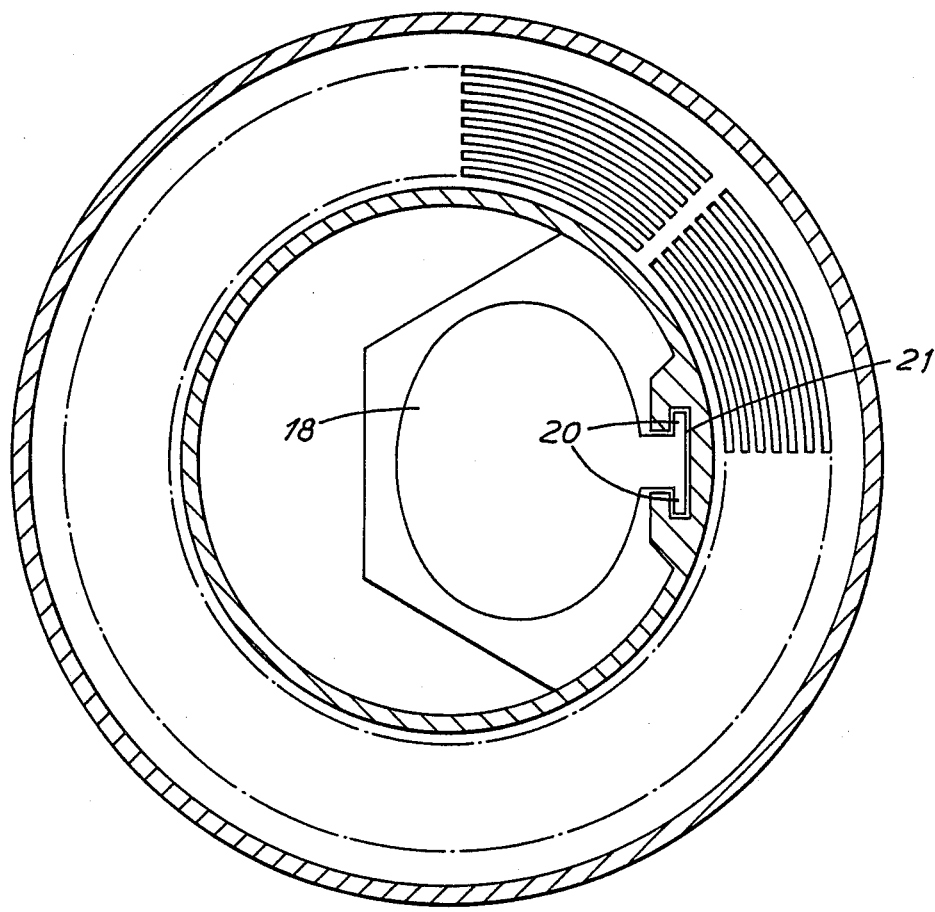

The circular pipe is secured to the underside of the top at 15 and has arranged on the right-hand-side a portion 16 inclined at approximately 45° within which is a circular opening 17. Arranged to close the opening 17 is a closure member 18 which is pivoted as seen more clearly in FIG. 2 by means of trunnions 20 in an opening 21.

The underside of the closure member 18 is provided with a rubber seal 22 so that in the closed position it butts against the edge of the opening 17, which is formed with a small upwardly directed rim indicated at 23 to ensure a good seal. The rubber seal is secured in place by means of a starlock washer 24.

Parallel with the opening 12 and spaced outwardly therefrom is a circular opening 26 containing an insect cover which although only shown at 27 extends throughout the annular opening 26.

The base of the pipe 13 which projects below the housing 10 is provided with a shoulder 28 against which abuts a rubber bushing 30 with fins 31. By means of the rubber bushing the valve body can be fitted into an appropriately sized opening, the rubber bushing and fins being compressed appropriately by insertion into a drainage pipe. This is in particular to be designed to be a push fit into a 110 mm soil and ventilation pipe. The rubber bushing can be removed altogether and the pipe 13 directly solvent welded onto an 83 mm PVC soil and ventilation pipe.

The ground drainage system is designed to be in accordance with BS 5572: 1978 (code of practice for sanitary pipe work).

With the present invention an effective and simple air admittance valve is provided.

I claim:

1. An air admittance valve for use in drainage systems comprising a generally circular pipe having axially opposite upper and lower end portions, said upper end portion having a free terminal edge, a cap; said cap having a top wall, a peripheral wall and a generally radially inwardly directed bottom wall terminating in a free edge provided with an opening corresponding to the exterior diameter of said circular pipe; said bottom wall having means therein for preventing insects from entering said cap, said pipe upper end portion being telescopically housed within said cap with said upper end portion free terminal edge contiguous said top wall, said pipe having a wall portion defining an air inlet opening for admitting air from said cap into said pipe, said air inlet opening being disposed at an angle of generally 45° to the pipe axis, a closure for said air inlet opening located at an inboard side of said pipe wall portion, means adjacent said upper end portion free terminal edge for pivoting said closure between first and second respectively open and closed positions whereby air is admitted from said cap into said pipe through said air inlet opening when said closure is in said first position and said closure when in said second position prevents the exit of air/drainage from said pipe through said air inlet opening, a pair of generally concentric downwardly projecting spaced ribs carried by said top wall, said pair of spaced ribs defining a generally circular slot therebetween, said circular slot having an outside diameter corresponding generally to the diameter of said circular pipe, and said pipe upper terminal edge being received in said circular slot.

2. The air admittance valve as defined in claim 1 wherein said pipe lower end portion includes a free terminal edge, a radially outwardly directed shoulder above said pipe lower end portion free terminal edge, a resilient bushing exteriorly surrounding said pipe lower end portion, said resilient bushing having an upper terminal end and a lower terminal end, said resilient bushing upper terminal end being disposed contiguous said shoulder, and said resilient bushing lower terminal end houses therein said pipe lower end portion free terminal edge.

3. The air admittance valve as defined in claim 2 including radially outwardly directed fin means carried by said bushing for sealingly fitting within an associated drainage pipe.

* * * * *